(12) United States Patent
Nucci et al.

(10) Patent No.: US 8,180,916 B1
(45) Date of Patent: May 15, 2012

(54) SYSTEM AND METHOD FOR IDENTIFYING NETWORK APPLICATIONS BASED ON PACKET CONTENT SIGNATURES

(75) Inventors: Antonio Nucci, San Jose, CA (US);
Ram Keralapura, Santa Clara, CA (US); Joshua Robinson, Mountain View, CA (US)

(73) Assignee: Narus, Inc., Sunnyvale, CA (US)

( * ) Notice: Subject to any disclaimer, the term of this patent is extended or adjusted under 35 U.S.C. 154(b) by 440 days.

(21) Appl. No.: 12/505,463

(22) Filed: Jul. 17, 2009

(51) Int. Cl.
*G06F 15/173* (2006.01)
*G06F 15/16* (2006.01)
(52) U.S. Cl. ......... 709/233; 709/223; 709/224; 709/225
(58) Field of Classification Search .................. 709/233, 709/223, 224, 225
See application file for complete search history.

(56) References Cited

U.S. PATENT DOCUMENTS

| | | | | |
|---|---|---|---|---|
| 7,639,714 | B2 * | 12/2009 | Stolfo et al. ................ | 370/474 |
| 2003/0108042 | A1 * | 6/2003 | Skillicorn et al. ............ | 370/389 |
| 2010/0071063 | A1 * | 3/2010 | Wang et al. .................. | 726/23 |
| 2010/0274786 | A1 * | 10/2010 | Harris et al. ................ | 707/737 |

OTHER PUBLICATIONS

Hafner, P., et al., "ACAS: Automated Construction of Application Signatures," in: Proceedings of the 2005 ACM SIGCOMM Workshop on Mining Network Data (Philadelphia PA, Aug. 26, 2005), pp. 197-202.
Sen, S., et al., "Accurate, Scalable In-Network Identification of P2P Traffic Using Application Signatures," in: Proceedings of the 13th International Conference on World Wide Web (New York NY, May 17-20, 2004), pp. 512-521.

* cited by examiner

*Primary Examiner* — Asghar Bilgrami
(74) *Attorney, Agent, or Firm* — Fernandez & Associates, LLP

(57) ABSTRACT

Embodiments of the invention provide a framework for traffic classification that bridges the gap between the packet content inspection and the flow-based behavioral analysis techniques. In particular, IP packets and/or IP flows are used as an input, network nodes are associated to specific network applications by leveraging information gathered from the web, and packet content signatures are extracted in an off-line fashion using clustering and signature extraction algorithms. The signatures learned are systematically exported to a traffic classifier that uses the newly available signatures to classify applications on-the-fly.

23 Claims, 4 Drawing Sheets

SYSTEM AND METHOD FOR IDENTIFYING NETWORK APPLICATIONS BASED ON PACKET CONTENT SIGNATURES

CROSS REFERENCE TO RELATED APPLICATIONS

This application is related to U.S. patent application Ser. No. 11/303,651 filed Dec. 16, 2005 and entitled "System and Apparatus of Data Compression for Computer Networks," which is incorporated herein by reference.

This application is related to U.S. patent application Ser. No. 12/104,723 filed Apr. 17, 2008 and entitled "System and Method for Internet Endpoint Profiling," which is incorporated herein by reference.

This application is related to U.S. patent application Ser. No. 12/501,383 filed Jul. 10, 2009 and entitled "System and Method for Identifying Network Applications," which is incorporated herein by reference.

BACKGROUND OF THE INVENTION

1. Field of the Invention

The present invention relates to computers and computer networks. More particularly, the invention relates to profiling Internet traffic flows to identify network applications responsible for the traffic flows.

2. Background of the Related Art

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network. Furthermore, security is becoming a challenging. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers was the norm in the recent past. This approach was successful because many traditional applications use port numbers assigned by or registered with the Internet Assigned Numbers Authority (IANA). The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier.

Techniques that rely on inspection of packet contents have been proposed to address the diminished effectiveness of port-based classification. These approaches attempt to determine whether or not a flow contains a characteristic signature of a known application. However, packet-inspection approaches face two severe limitations. First, these techniques only identify traffic for which signatures are available. Maintaining an up-to-date list of signatures is a daunting task. Information is rarely available, up-to-date or complete. Furthermore, the traditional ad-hoc growth of IP (i.e., Internet Protocol) networks, the continuing rapid proliferation of applications of different kinds, and the relative ease with which almost any user can add a new application to the traffic mix in the network with no centralized registration, are some factors contributing to this "knowledge gap". Second, packet inspection techniques only work if and only if full packets (i.e., header and payload) are available as an input and are completely ineffective when only coarser information at traffic flow level is available. Unfortunately, only a few service providers today have instrumented their networks with packet inspection appliances while the majority of them have access only to traffic flows extracted directly from the routers.

The web (or "World Wide Web") is a system of interlinked hypertext documents (i.e., web pages) accessed via the Internet using URLs (i.e., Universal Resource Locators) and IP addresses. The Internet is composed of machines (e.g., computers or other devices with Internet access) associated with IP addresses for identifying and communicating with each other on the Internet. The Internet, URL, and IP addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. In vast majority of scenarios, information about servers such as the IP address is publicly available for user to access. In peer-to-peer based communication, in which all endpoints can act both as clients or servers, the association between an end point and the P2P application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

Generally speaking, embodiments of the invention provide a framework for traffic classification that bridges the gap between the packet content inspection and the flow-based behavioral analysis techniques. In particular, it is an objective of the invention to leverage the merits of the packet content inspection techniques by guaranteeing the high-accuracy in classifying application-specific traffic while providing the robustness to detect zero-day applications (i.e., newly developed without historically generated signatures) and the ability to work with both packet and flow characteristics of the flow-based behavioral analysis techniques. Embodiments of the invention takes IP packets and/or IP flows as an input, associates network nodes to specific network applications by leveraging information gathered from the web, and automatically extracts packet-level and/or flow-level signatures in an off-line fashion using clustering and signature extraction algorithms. The signatures learned are systematically exported to a traffic classifier that uses the newly available signatures to classify applications on-the-fly. Through this document, the terms "flow", "traffic flow", "network flow", and "network traffic flow" may be used interchangeably depending on the context. In addition, the term "application" and "network application" may be used interchangeably depending on the context.

It is another objective of the invention to not only work with flows (i.e., network traffic flows) as input data but also implement an extensible architecture to work with packets as input data thus providing solutions for a variety of different network configurations.

It is still another objective of the invention to identify the specific application responsible for an IP stream thus providing broader applicability to business and traffic engineering tasks compared to application-class techniques that does not identify to the specific application.

It is yet another objective of the invention to perform the classification in a purely automated and transparent fashion (i.e., no off-line training or human intervention required) even in the context of zero-day applications.

It is yet another objective of the invention to perform the classification in a highly accurate manner even over long-lasting time periods. It is achieved by (i) extracting the application signature based on server specific flows and packets associated with each individual application, (ii) leveraging the web as an extra source of information, and (iii) tracking changes between new signatures and old-signatures and to maintain the up-to-date signature-list.

It is yet another objective of the invention to maintain low evaluation overhead thus being practical for online traffic classification at very high speed links.

It is yet another objective of the invention to extract signatures that are robust to routing asymmetry (i.e., measurement point may capture only one direction of a bidirectional communication due to the prevalence of asymmetric routing in the Internet).

In general, in one aspect, the present invention relates to a method for profiling network traffic of a network. The method includes obtaining a first plurality of packets associated with a first server in the network from a plurality of flows in the network traffic, extracting a first plurality of features corresponding to the plurality of flows from the first plurality of packets, determining, using a computer, a first packet content signature based on a longest common subsequence among the first plurality of features obtained by applying a sliding window to the first plurality of features, wherein the packet content signature is associated with a network application running on the first server, and determining, using the computer, a second server in the network as running the network application by analyzing a second plurality of packets associated with the second server in the network traffic based on the first packet content signature.

In general, in one aspect, the present invention relates to a computer readable medium storing instructions, when executed by the computer to profile network traffic of a network, the instructions include functionality for obtaining a first plurality of packets associated with a first server in the network from a plurality of flows in the network traffic, extracting a first plurality of features corresponding to the plurality of flows from the first plurality of packets, determining, using a computer, a first packet content signature based on a longest common subsequence among the first plurality of features obtained by applying a sliding window to the first plurality of features, wherein the packet content signature is associated with a network application running on the first server, and determining, using the computer, a second server in the network as running the network application by analyzing a second plurality of packets associated with the second server in the network traffic based on the first packet content signature.

In general, in one aspect, the present invention relates to a system for profiling network traffic of a network. The system includes a statistical analyzer configured to obtain a first plurality of packets associated with a first server in the network from a plurality of flows in the network traffic, extract a first plurality of features corresponding to the plurality of flows from the first plurality of packets, a signature generator configured to determine a first packet content signature based on the first plurality of features, a signature library comprising a plurality of packet content signatures, a distiller configured to qualify the first packet content signature for adding to the signature library, and a processor and memory storing instructions when executed by the processor comprising functionalities to analyze a second plurality of packets associated a the second server in the network traffic based on the signature library to generate an analysis result, and determine a network application associated with the second server based on the analysis result.

Other aspects and advantages of the invention will be apparent from the following description and the appended claims.

BRIEF DESCRIPTION OF DRAWINGS

FIG. 3 shows an example according to aspects of the invention.

DETAILED DESCRIPTION

Figure 1:
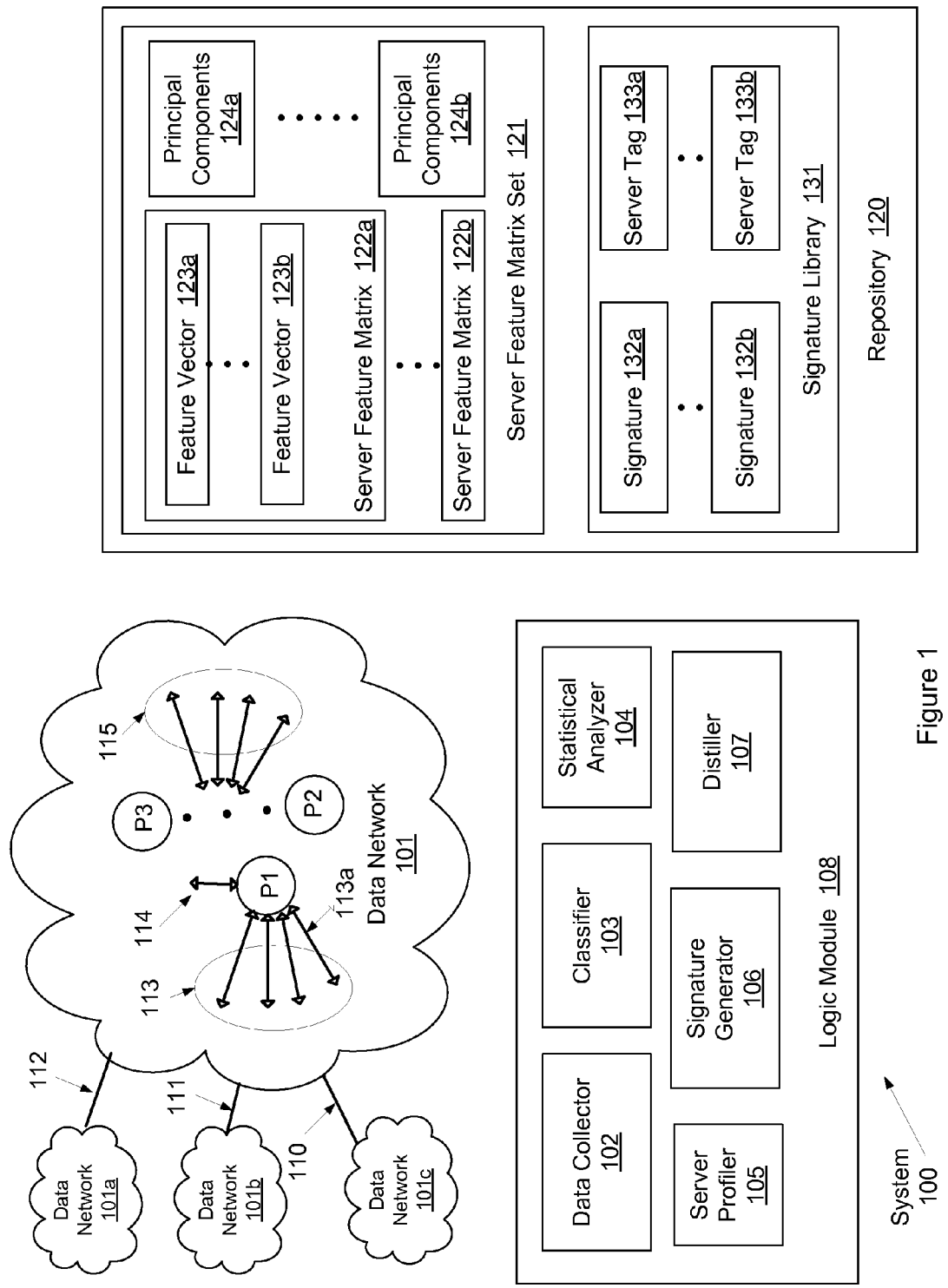
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, a traffic stream (or flow) between two network hosts is a series of data records regarding the communication between the two network hosts engaged in a Internet transaction. Each traffic stream is uniquely defined by a 5-tuple identifier (i.e., source address, destination address, source port, destination port, and transport protocol) and is referred to as attached to each of the two hosts. Throughout this document, the terms "traffic flow", "flow", "traffic stream" and "stream" are used interchangeably.

When a data record of the traffic stream includes the entire packet (i.e., packet header and payload content), the traffic stream includes full packet visibility. Full packet visibility represents the finest level of information that can be collected for an Internet transaction.

From time to time, only information about packet headers (i.e., without payload content) can be collected for an Internet transaction. When a data record of the traffic stream includes only packet header, the traffic stream includes the traffic flow visibility only. Traffic flow visibility represents the second finest level of information that can be collected for an Internet transaction. In this case, an Internet transaction between two network hosts can only be partially reconstructed by grouping all packet headers with a common 5-tuple identifier (i.e., source address, destination address, source port, destination port, and transport protocol), while the fingerprint (at the packet payload level) of the application involved in such a transaction is lost. Throughout this paper, the term "application" is used to refer to an application (e.g., HTTP (HyperText Transfer Protocol), SMTP (Simple Mail Transfer Protocol), IRC (Internet relay chat), FTP (File Transfer Protocol), GTALK® (a registered trademark of Google, Inc., Mountain View, Calif.), MSN® (a registered trademark of Microsoft Corporation, Redmond, Wash., etc.) associated with or based on top of the application layer (i.e., layer 7) of the OSI model (i.e., Open Systems Interconnection Reference Model of the network architecture).

In one or more embodiments of the invention, classifying an application with only traffic flow visibility is performed by leveraging statistical properties of the flow. Example of such statistics are average and standard deviation of packet sizes in the flow, or minimum, average, and maximum inter-arrival packet times in the flow, etc.

One way to collect traffic flows from the network is to leverage the router infrastructure. All routers today are capable to provide such information via protocols such as Netflow® (a registered trademark of Cisco Systems, Inc., San Jose, Calif.) or the equivalent JFlow (a registered trademark of Juniper Networks, Inc., Sunnyvale, Calif.). Sampling techniques are often applied when routers are used to collect such information in order to reduce the amount of processing time required to carry over such a task. For example, Cisco routers are typically deployed with packet sampling rate 1:200 (or 1:1000), meaning that not all packet headers of a traffic flow are visible but only 1 out 200 packets of a flow (or 1 out of 1000 packets). Packet headers collected from a sampled version of a traffic flow is referred to as netflow-like records and the sampled version of the traffic stream includes the netflow-like record visibility only. Throughout this document, packet headers collected from non-sampled traffic flows or netflow-like records collected from sampled traffic flows are generally referred to as packet header records.

Although the general system architecture of embodiments of the invention remains the same independently of the type of traffic streams (e.g., full packets, packet headers, netflow-like records, etc.) being processed, the specific operations executed depend on the type of traffic stream. While system modules and methods are described considering packet header records (containing either packet headers or netflow-like records) as deployment scenarios in the related U.S. patent application Ser. No. 12/501,383 filed Jul. 10, 2009 entitled "System and Method for Identifying Network Applications." In the following, the system and method are applied to full packet deployment scenarios or to operate in the context of heterogeneous deployment scenarios in which full packets may be obtained from specific parts of the network while packet header records may be obtained from other parts of the network.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data networks (101, 101a, 101b, and 101c), a logic module (108), and a repository (120). Each of these networks may be a portion of a larger network and are shown to be coupled via links (110, 111, 112). The network (101) includes hosts (P1, P2, P3, etc.). As shown, host (P1) is associated with traffic streams (113, 114) (e.g., as a source or destination) while hosts (P2, P3, etc.) are associated with traffic streams (115). Further, the traffic streams (113, 114) are referred to as attached to the server (P1) while the traffic streams (113) include a particular stream (113a). Each of these streams (113, 114, 115) may include packet header records (i.e., packet headers or netflow-like records) and/or full packets.

As shown in FIG. 1, the logic module (108) includes a data collector (102), a classifier (103), a statistical analyzer (104), a server profiler (105), a signature generator (106), and a distiller (108). The data collector (102), the classifier (103), and the statistical analyzer (104) may be referred to as a stream processor.

Further as shown in FIG. 1, the repository (120) includes a server matrix set (121) and a signature library (131). The server matrix set (121) further includes a number of server matrices (122a, 122b, etc.) corresponding to principal components (124a, 124b, etc.). The signature library (131) further includes signatures (132a, 132b, etc.) corresponding to server tags (133a, 133b, etc.). In one or more embodiments, signature library (131) may be implemented as a database, a file, a linked list, or other suitable data structures.

In one or more embodiments, the data collector (102) is configured to observe and collect, for example from links (110, 111, 112), information regarding traffic streams (e.g., packet headers/netflow-like records stream (113), full packets stream (114), etc.) when available while the classifier (103) is configured to filter and organize the collected traffic stream data regarding duplicate records or out-of-order records, and the statistical analyzer (104) is configured to extract statistics from the traffic streams (113, 114). Throughout this document, the phrase "collect the traffic streams" may be used to mean "collect information regarding traffic streams" depending on the context.

In one or more embodiments, the classifier (103) is further configured to classify the processed traffic streams in real time using a list of known signatures (e.g., 132a, 132b, etc.) in the signature library (131), previously extracted by the signature generator (106). When full packets (i.e., header+payload) are collected from the traffic stream (114), the classifier (103) uses packet-content signatures to classify the traffic stream (114). When packet header records (i.e., packet headers or netflow-like records) are collected from the traffic streams (113), the classifier (103) uses flow-feature signatures. Every traffic stream for which a signature is available is classified (i.e., assigned a classification) and promptly reported to the end-user (not shown). The classification may be associated (or tagged) with an application, which may be previously identified by the server profiler (105) or presently unknown yet to be identified. More details of identifying the application by the server profiler (105) are described later.

In one or more embodiments, when an unknown stream (i.e., a stream for which a signature is not available in the signature library (131)) is observed, the classifier (103) forwards a summary of the unknown stream to the statistical analyzer (104). Throughout this document, this "summary of the traffic stream" may be referred to as "informational block." The composition of the information block depends on the nature of the traffic stream being processed. When packet headers or netflow-like records are received from the input stream (113), the informational block is generated by extracting fundamental statistics from the stream (113). The details of such statistics are described in the related U.S. patent application Ser. No. 12/501,383 filed Jul. 10, 2009 entitled "System and Method for Identifying Network Applications." Conversely, when full packets are received in the input stream (114), the information block is generated by extracting B bytes (e.g., the top B bytes) of N packets (e.g., the first N packets) from the stream (114) after duplicate packets have been removed and the remaining packets properly re-ordered. More details are described later.

Informational blocks of unclassified traffic streams (113, 114) are then passed to the statistical analyzer (104).

In one or more embodiments, the statistical analyzer (104) is configured to perform two main tasks described below. For example, the tasks may be performed on a periodic basis, i.e., over a recurring time window $T_w$ where the index w represents a time point sequence starting from an arbitrary value (e.g., 0) and the period T may be a constant value (e.g., 1 second, 1 minute, 1 hours, 1 day, or any other suitable time periods) throughout the time point sequence or a variable value that is different for different time point in the sequence. An example of the time point sequence is $T_0, T_1, \ldots T_{w-1}, T_w$. Throughout this document, depending on the context, the term "$T_w$" may refer to a time point in the time point sequence or the time window starting from the time point.

In one or more embodiments, the statistical analyzer (104) is configured to identify the functional role (i.e., client versus server) of the most recurrent IP addresses being observed in streams (113, 114, 115), for example during each time window $T_w$. In one or more embodiments, this is accomplished by tracking the cumulative number of flows being destined to each IP address and sorting the ratio of such cumulative number of flows divided by the total amount of traffic being observed. At the end of the time window $T_w$, the statistical analyzer (104) identifies the top P IP addresses contributing to the majority of traffic observed in the current time window $T_w$ as the server IP addresses referred to as $P(T_w)=\{p_1, p_2, \ldots, p_P\}(T_w)$. For example, $P(T_w)$ may include P1 and P2.

In one or more embodiments, the statistical analyzer (104) is configured to exclude the top P server IP addresses $P(T_{w-1})=\{p_1, p_2, \ldots, p_P\}(T_{w-1})$ observed in the previous time window $T_{w-1}$ when identifying $P(T_w)=\{p_1, p_2, \ldots, p_P\}(T_w)$ such that $P(T_w) \cap (T_{w-1})=\{0\}$ in order to eliminate processing duplicate servers in adjacent time windows. For example, $P(T_{w-1})$ may include P3, which is excluded when identifying $P(T_w)$. In one or more embodiments, the statistical analyzer (104) is configured to exclude the top P server IP addresses $P(T_{w-1})=\{p_1, p_2, \ldots, p_P\}(T_{w-1})$ observed in X number of previous time windows (e.g., $T_{w-x}$ through $T_{w-1}$) when identifying $P(T_w)=\{p_1, p_2, \ldots, p_P\}(T_w)$ such that $P(T_w) \cap P(T_{w-i})=\{0\}$ for $i \in \{1 \ldots X\}$ in order to eliminate processing duplicate servers in adjacent time windows. For example, $P(T_{w-x})$ may include P3, which is excluded when identifying P(Tw).

As will be discussed later, the server profiler (105) is configured to identify applications running on the top P servers. However, a server that cannot be identified (i.e., server tag=unknown) during some time window may become identifiable in a later time window (e.g., few days later) in case an Internet user post something available on the Internet regarding this server. Thus, in the embodiments described above, the system has a short memory of X time windows. In other words, the system excludes all servers considered in the previous X time windows and when the short memory period expires, the unidentified servers are considered in the statistical analysis again.

In one or more embodiments, the statistical analyzer (104) is configured to generate the features associated with the set $P(T_w)$ during $T_w$ by processing M streams attached to each server $p_i$ in $P(T_w)$. In one or more embodiments, the features are formatted as feature vectors (e.g., 123a, 123b, etc.). For example, the feature vectors (123a, 123b) may be extracted from streams (113, 114) attached to the server P1. More details of generating the feature vectors are described later in reference to FIG. 2.

In one or more embodiments, for each server $p_i$ (e.g., P1, P2) in $P(T_w)$ the statistical analyzer (104) is configured to create a server feature matrix $A(p_i)(T_w)$ (e.g., 122a, 122b) and to organize all these matrices into a server feature matrix set (e.g., 121) represented as $A(T_w)=\{A(p_1), A(p_2), \ldots A(p_P)\}(T_w)$ with $i \in \{1 \ldots p\}$. In one or more embodiments, server feature matrix $A(p_i)(T_w)$ is constructed using feature vectors of the server $p_i$ as row vectors of the matrix. For example, the server feature matrix (122a) may be $A(P1)(T_w)$, which includes feature vectors (123a, 123b) as row vectors. The dimensions of each of these matrices depends on the composition of the informational block being used to process streams associated with the respective server $p_i$. Although not specifically shown in FIG. 1, the repository (120) may include another server feature matrix set, for example created during another time window $T_{w-1}$ and represented as $A(T_{w-1})=\{A(p_1), A(p_2), \ldots A(p_P)\}(T_{w-1})$.

In one or more embodiments, when packet headers or netflow-like records are used, each matrix $A(p_i)$ is of size M times S where M represents the number of streams, collected during a time window, attached to the server $p_i$ and S represents the number of statistics extracted from each stream. In one or more embodiments, when full packets are used, each matrix $A(p_i)$ is of size M times B times N where N represents the number of packets extracted per stream and B represents the number of bytes extracted per packet. For example, the server feature matrix $A(p_i)$ may include M row vectors with each row vector including these B bytes of the N number of packets extracted per stream. In other examples, different arrangement of the B bytes of the N number of packets for each of the M streams may be used to form the server feature matrix $A(p_i)$ without deviating from the spirit of the invention. Although not specifically shown, each of S, M, B, and N may have different values for different time windows or different servers. In the remainder of this document, the description is focused on embodiments with streams including the full packet while each matrix $A(p_i)(T_w)$ is of size M*B*N. Throughout this document, the matrix $A(p_i)(T_w)$ may be referred to as $A(p_i)$ where the omitted $T_w$ is implied as the particular time window when the matrix is created.

In one or more embodiments, the server profiler (105) searches the web for semantic information associated with a server IP address so as to automatically map a server IP address to a specific application that is responsible for the server attached streams without requiring pre-knowledge or off-line training or other human intervention. The server $p_i$ of the IP address is referred to as being tagged (using a server tag) with this specific application. Similarly, a signature associated with the server $p_i$ is referred to as being tagged with this specific application. Accordingly, traffic flows determined to match the tagged signature can be classified as being generated by this specific application. More details of the server profiler (105) are described in the related U.S. patent application Ser. No. 12/104,723 filed Apr. 17, 2008 and entitled "System and Method for Internet Endpoint Profiling." More details of determining traffic flows as matching a signature are described later.

As an example, traffic streams (113, 114) attached to the server P1 may be tagged with the server tag (133a) generated by the server profiler (105) that identifies the application running on the server P1. Accordingly, the signature (132a) generated from the traffic streams (113, 114) by the signature generator (106) is tagged with the server tag (133a). In one or more embodiments, an association between the server tag (e.g., 133a) and the tagged signature (e.g., 132a) is stored in the signature library. In one or more embodiments, when the server profiler (105) fail to identify the application running on the server $p_i$, an unknown server tag is associated with the signature (e.g., 132a) of the server $p_i$ and is stored in the signature library. As discussed above, the server $p_i$ may be analyzed again in a later time window. More details of using the server profiler (105) to generate server tags are described in the related U.S. patent application Ser. No. 12/104,723 filed Apr. 17, 2008 and entitled "System and Method for Internet Endpoint Profiling," which is incorporated herein by reference.

In one or more embodiments, the signature generator (106) is configured to, at the end of each time window $T_w$, receive the server feature matrix set (121) $A(T_w)=\{A(p_1), A(p_2), \ldots A(p_P)\}(T_w)$ from the stream processor. For example, the server feature matrix set (121) may be stored in the repository (120) by the stream processor and subsequently retrieved by the signature generator (106). As discussed above, in embodiments with streams including full packets, each matrix $A(p_i)(T_w)$ is of size M*B*N. In such embodiments, the signature generator (106) processes each $A(p_i)(T_w)$ matrix separately in search for commonality or strong similarity of statistical features across the M flows in the matrix.

In one or more embodiments, the signature generator (106) is configured to generate each packet content signature based only on streams attached to an individual server such that the packet content signature is specific to the application running the server responsible for the M flows in the server feature matrix. For example, the application may be an unknown application to be identified later or a known application tagged to the server by the server profiler (105). As discussed above, in one or more embodiments, the correlation between the application and the tagged signature is stored in the signature library.

In one or more embodiments, signatures (132a, 132b, etc.) are packet content signatures. In one or more embodiments, the signature library (107) contains a complete and up-to-date list of all packet content signatures generated by the signature generator (106) up to time $T_w$ for use by the classifier (103) during the time window $T_w$.

Generally speaking, new versions of an application may be released over time causing packet content signatures associated with older versions to be un-applicable over time. In one or more embodiments, the distiller (108) is configured to expire (e.g., delete from the signature library (107)) flow-feature signatures based on a specified length of inactivity such that the current list of flow-feature signatures stored in the signature library (107) is ensured to be accurate and concise.

Further, one application may be mapped to several packet content signatures. For example, different versions of the same application may have similar flow-feature signatures with slight differences among them. In one or more embodiments, the distiller (108) is configured to identify such applications and consolidate similar flow-feature signatures.

Furthermore, over time the number of packet content signatures may grow to be extremely large, thus leading to overlapping flow-feature signatures. In one or more embodiments, the distiller (108) is configured to identify and consolidate such overlapping flow-feature signatures.

Figure 2:
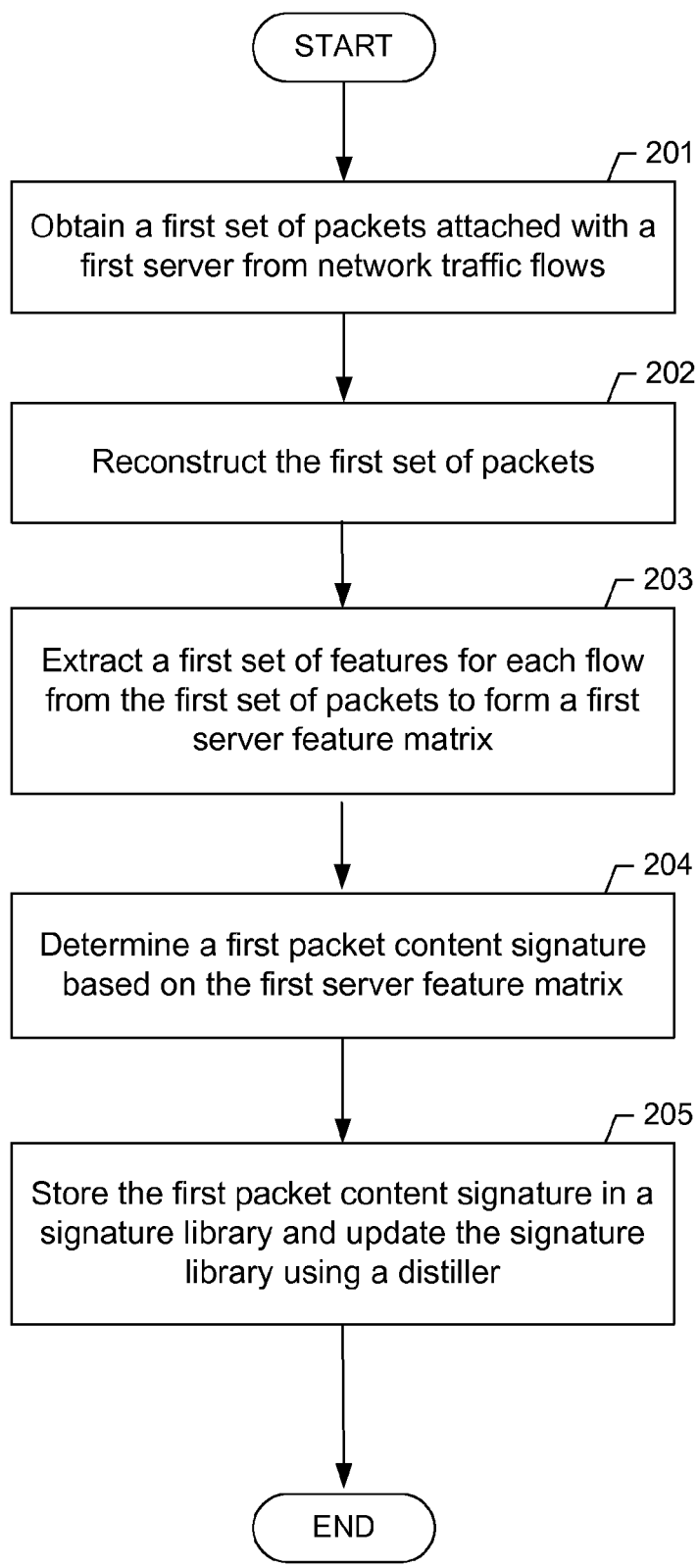
FIGS. 2 and 3 show flowcharts of a method according to aspects of the invention.
Figure 3:
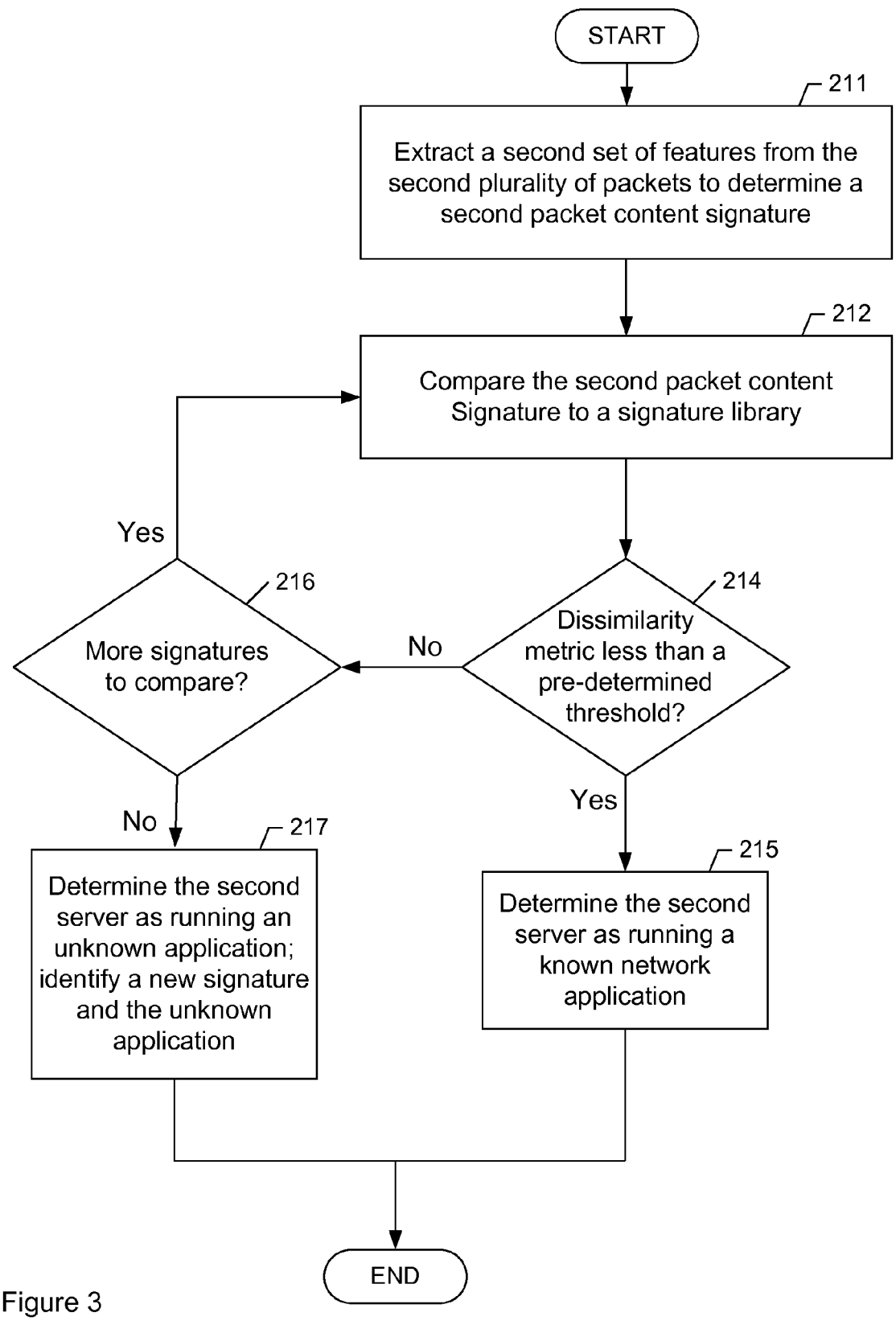

FIGS. 2 and 3 depict a flowchart of a method in accordance with one or more embodiments of the invention. In one or more embodiments of the invention, one or more of the steps shown in FIGS. 2 and 3 may be omitted, repeated, and/or performed in a different order. Accordingly, embodiments of the invention should not be considered limited to the specific arrangements of steps shown in FIGS. 2 and 3. In one or more embodiments of the invention, the method depicted in FIGS. 2 and 3 may be practiced using system (100) described with respect to FIG. 1 above.

In particular, FIG. 2 depicts the method for generating signatures, for example using the signature generator (106), to be stored in the signature library (107) as described in reference to FIG. 1 above. FIG. 3 depicts the method for classifying (i.e., identifying applications associated with) traffic flows based on such signatures in the signature library, for example using the classifier (103) as described in reference to FIG. 1 above. In one or more embodiments of the invention, the methods depicted in FIGS. 2 and 3 may be pipelined such that the classification of traffic flows in time window $T_w$ based on signatures generated in previous time windows (e.g., $T_{w-1}$) may be performed in parallel with identifying new servers in time window $T_w$ not present in previous time windows (e.g., $T_{w-1}$) and generating new signatures associated with such new servers.

Regarding FIG. 2, in Step 201, a first set of packets attached with a first server is obtained from network traffic flows. For example, the packets associated with the server (P1) in network traffic streams (e.g., (113, 114) of FIG. 1) may be obtained by the classifier (103) during one (referred to as $T_w$) of a sequence of time windows as described in reference to FIG. 1 above.

In one or more embodiments, a server (referred to as the first server, e.g., P1 of FIG. 1) is identified from the network traffic streams (e.g., 113, 114, and 115 of FIG. 1) such that the first set of packets are obtained from those streams attached with the first server (e.g., 113, 114). For example as described in reference to FIG. 1 above, the first server may be identified by the classifier (103) based on the top P IP addresses $P(T_w)=\{p_1, p_2, \ldots, p_P\}(T_w)$ contributing to the majority of network (101, 101a, 101b, 101c, 101d, etc.) traffic observed in the time window $T_w$ where the IP address of $P1 \in P(T_w)$.

Specifically in such embodiments, an IP address is identified as a server by analyzing a set of data packets in the network traffic streams (e.g., 113, 114, and 115 of FIG. 1) to evaluate percentage occurrences of the IP address in destination IP address fields in the set of data packets. In one embodiment, P1 is identified as the first server when such percentage occurrences associated with the IP address of P1 exceeds a pre-determined threshold. For example, the IP address of P1 may be among the top P IP addresses occurring in the destination IP address fields in the set of data packets. Accordingly, each packet having the IP address of the first server occurring in either the source or destination IP address fields may be extracted from the set of data packets to form the first set of packets attached to the first server.

In Step 202, in one or more embodiments, the first set of packets are reordered and reassembled into un-fragmented and in-order traffic flows for further processing. For example, a queue engine may be used to store incoming packets in a packet memory controlled by a link list controller. Accordingly, a packet assembler may be used to extract information from each packets to determine if the packet header is fragmented or out-of-order. If the packets are determined to be out-of-order, the queue engine may use a reordering unit to modify links with the link list controller to reorder the packets. A fragment reassembly unit may also be used to reassemble fragments into complete un-fragmented packets.

For example, the packets may be reordered and un-fragmented for the TCP protocol (i.e., transmission control protocol, which is the transport layer protocol used in the Internet) which is widely used today and described in RFC (Defense Advanced Research Projects Agency (DARPA) request for comments) 793. TCP is a connection-oriented reliable protocol designed for transport over potentially unreliable network protocols, and is designed to recover from data that is damaged, lost, duplicated, or delivered out-of-order by the underlying transport layer. The mechanism used by TCP to implement the aforementioned reliability is the sequence number. The sequence number is a 32-bit value between 0 and $2^{32}-1$ inclusive as described in RFC 793. Since TCP is a full-duplex network transmission protocol, both the sender and receiver have their own independent sequence. The initial sequence numbers are selected and exchanged by the two hosts during the initial connection handshaking. When the two hosts are observed exchanging the initial sequence numbers, the initial sequence numbers of the two hosts are stored in memory. When the same two hosts are later observed exchanging packets, the sequence numbers of the two hosts are recalled to determine whether the payload of the exchanged packets are either partially or completely new data, and the correct logical ordering of the packets are restored accordingly. The logic for determining the validity of a packet and its payload are described in RFC 793.

In one or more embodiments of the invention, B bytes (e.g., the first B bytes) in each of N packets (e.g., the first N packets) of the reordered and reassembled first set of packets are designated as the informational block, which is used to classify the stream (from which the first set of packets are extracted) into a detected or unknown application. During this step, a state machine may be used to parse the informational block in search for the signature. Initially, the classification module contains only signatures for generic applications (e.g., layer 7 protocols such as HTTP, SMTP, IRC, etc.). If the stream can not be classified using the N times B bytes constituting the informational block, the application is reported as unknown and the informational block is forwarded (e.g., to the statistical module described in reference to FIG. 1 above) for further processing. From time to time, new signatures may be generated as new applications are automatically detected.

In Step 203, a first set of features for a particular stream (e.g., 113a) is extracted from the first set of packets to be included when forming a first server feature matrix of the first server P1. In one or more embodiments, the first set of features is extracted from re-ordered/reconstructed flow of the first set of packets. For example, the first set of features may be a row vector format of the informational block including B bytes extracted from each of N packets of the particular stream as described in reference to FIG. 1 above. In another example, the informational block may be in an intermediate format from which the first set of features may be extracted.

In one or more embodiments, the server IP address is automatically mapped (or tagged) to a known application that is responsible for the attached streams (e.g., 113, 114). For example, the server IP address may be automatically mapped by the server profiler (105) described in reference to FIG. 1 above. More details of the server tagging are described in the related U.S. patent application Ser. No. 12/104,723 filed Apr. 17, 2008 and entitled "System and Method for Internet Endpoint Profiling," which is incorporated herein by reference.

Accordingly, in embodiments described above, the first server with associated server feature matrix as well as a tagged known application may be identified and generated from the network traffic flows during the time window $T_w$.

In Step 204, a packet content signature is determined from the first server feature matrix. For example, an input matrix of size (B×N)×M×P may be formed from P servers each with M attached streams. In one or more embodiment of the invention, for each of the P servers separately, informational blocks each of size (B×N) for each of M streams are considered in search for content commonalities, i.e., a packet-content signature across the M streams. Two algorithms with different computational complexity and ability to extract complex application signatures are described below.

In one or more embodiment, Rabin Fingerprints (RF) algorithm, known to those skilled in the art, is used to extract packet content signatures for speed consideration. For example, high speed calculation of signatures for the packet payload based on the RF algorithm identifies repeating content at line speed.

In one or more embodiment, Longest Common Subsequence Windowed ($LCS^W$) signature algorithm is used to obtain successive signatures using a sliding window over the data in the informational block. For example, a sliding window of 150 bytes may be used over the packet content of each stream of total size (B×N) bytes where the number of times each signature is seen in the M traffic streams is stored. The packet content signature for the application, from which the M streams are generated, is identified when the number exceeds a pre-determined threshold T.

In one or more embodiments, the window size can be changed to tradeoff between efficiency (e.g., by using large windows) and effectiveness in identifying signatures containing small variations in the payload content (e.g., by using smaller windows).

Obfuscating strategies employed by novel applications have the characteristics that signatures change during their propagation into the network. For example, wild-cards or completely random characters may be used by such application. In another example, such application may encrypt the payload with a hidden decryption key. However, even the most obfuscated applications have an invariant across different flows. In one or more embodiments, this application behavior is addressed by determining the longest common subsequence between two strings. A string s is said to be a subsequence of string S, if s can be obtained by deleting 0 or more characters from string S. Thus, a string s is a longest common subsequence of strings S and T, if s is a common subsequence of S and T and there is no other common subsequence of S and T of greater length. For example, if two packet payloads contain the following strings "houseboat" and "computer", the longest common subsequence that LCS reports is "out". In contrast, since the RF algorithm looks for the common substring, it will not report any commonality between the two packet content streams.

An example dynamic programming approach for identifying the LCS is shown in TABLE 1, which has polynomial complexity O(nm), where n and m represent the length of the two strings A and B in tokens. A token is a contiguous set of characters, i.e., a substring which is by default set to one character. As shown in TABLE 1, for each of the m starting points of A, the algorithm checks for the longest common subsequence of tokens starting at each of the n starting points of B. Thus, the total number of checks is O(mn). At the end of the algorithm, the longest common subsequence is obtained as s(m, n) with length L(m, n).

TABLE 1

Longest Common Subsequence Algorithm (LCS).

1: Parameters: Input1 A, Input2 B;
2: Parameters: Length of input1 m tokens, Length of input2 n tokens;
3: LCS(A,B)
4: Allocate memory L[m][n]
5: for i := 0 to m do
6: L(i, 0) := 0;
7: end for
8: for j := 0 to n do
9: L(0, j) := 0;
10: end for
11: for i := 1 to m do
12: for j := 1 to n do
13: if A[i] == B[j] then
14: L(i,j) := 1 + L(i−1,j−1);
15: else
16: L(i,j) := max(L(i−1,j),L(i,j−1))
17: end if
18: end for
19: end for
20: return(L(m,n));

However, the space complexity O(nm) of the dynamic algorithm of TABLE 1 may quickly become prohibitive when the sizes of the two payloads being compared increase. For instance, if the two flows being compared have payloads of 10 KB each, not unlikely given that the CodeRed worm had a payload of 4156 bytes, then the memory needed approaches 100 MB.

In one or more embodiments, a windowed version of the LCS algorithm namely, $LCS^W$, is used to trade-off memory utilization for a small increase in the CPU utilization and a small reduction in accuracy of the signature extraction. An example of the $LCS^W$ is shown in TABLE 2 below.

In one or more embodiments, $LCS^W$ algorithm compares smaller portions across strings thereby requiring smaller tables in memory yet still be able to construct the complete signature without a significant loss in accuracy. In one or more embodiments, $LCS^W$ algorithm employs a divide-and-conquer approach, which begins by first dividing each input string to a number of smaller windows depending on the initial window size. In each of the iterations, a window of the first string is compared with all windows of the other string. The two windows are dropped if the number of matching tokens is less than a pre-determined minimum value. Otherwise, the two windows are added to their respective flow buffers for further analysis, while the window size is reduced in half for the next iteration. Thus, large windows used at the beginning of the content analysis result in quickly removal of the non-matching portions, while progressively reducing the window size over subsequent iterations maintains the accuracy leading to the actual matching content.

TABLE 2

Longest Common Subsequence Window Algorithm (LCSW).

1: Parameters: Initial window size i, Minimum window size min;
2: Parameters: Token size b bytes, Minimum matched tokens per window t;
3: Inputs: Flow1 f1, Flow2 f2;
4: Initialization: Window size w := i, pos1 := 0, pos2 := 0;
5: while w > min do
6: while pos1 < len(f1) do
7: while pos2 < len(f2) do
8: Number of tokens matched k:=LCS(A,B);
9: where, A := f1[pos1−(pos1 + w)] and
10: where, B := f2[pos2−(pos2 + w)];
11: if k > t then
12: newf1 := newf1 +A;
13: newf2 := newf2 +B;
14: end if
15: pos2 := pos2 + w;
16: end while
17: pos1 := pos1 + w;
18: end while
19: w := w/2;
20: f1 := newf1;
21: f2 := newf2;
22: Reset newf1 and newf2;
23: end while In an example, the Longest Common Subsequence Windowed ($LCS^W$) signature algorithm described above is applied to three network applications, namely BitTorrent, EDonkey, and Gnutella. The $LCS^W$ signature extracted for BitTorrent is 0x13426974546f7272656e742070726f746f636f6c with ASCII value of BitTorrent protocol. The $LCS^W$ signature extracted for EDonkey is 0x000000. As for Gnutella, three $LCS^W$ signatures are extracted, namely 0x47e5554454c4c4120434f4e4e454354 with ASCII value of GNUTELLA CONNECT, 0x474554202f7572692d7265732f4e32523f75726e3a736861313a with ASCII value of GET/urires/N2R?urn:sha1:, and 0x48454144202f7572692d7265732f4e32523f75726e3a with ASCII value of HEAD/uri-res/N2R?urn:. The three signatures extracted for Gnutella correspond to three different operations modes. This demonstrate that the methods described above are capable to detect not only the application signature but also specific signatures indicative of each operation mode of the application.

In one or more embodiments, in Step 205, the application signatures are stored in the signature library and are updated, for example using the distiller described in reference to FIG. 1 above to accomplish four main tasks in a periodic fashion, i.e., every $T_w$.

First, the distiller expires signatures characterized by long inactivity time, i.e., the last time a traffic stream matching those signatures was processed by the system exceeded a pre-specified internal threshold γ. This task is referred to as signature-expiration process.

Second, for the remainder signatures in the list, the distiller provides an indicator that reflects the overall quality of the signatures present in the signature list such as to alert the system of situations in which distinct signatures may look similar. This second task is referred to as signature-list quality estimation process.

Third, distiller decides whether a new signature can be appropriately added to the signature list without compromising the quality of the current signature list. A set of signatures is said to be of good quality if the signatures constituting the set are dissimilar from each other. This task is referred to as signature-specific quality estimation process.

Fourth, the distiller is responsible to optimize the signature list by deciding which signatures can be consolidated, i.e., appending more than one signature to the same application. A stream X is reported as belonging to application $a_i$ if the signatures of the stream matches any of the signatures associated to application $a_j$, i.e., OR operations across all the signatures of application $a_i$. This task is referred to as signature-list consolidation process.

Given a set of signatures at time $T_i$ called $Z'(T_i) = \{z_1'(\gamma_1), z_2'(\gamma_2), \ldots z_{Z'}'(\gamma_{Z'})\}(T_i)$, where $\gamma_i$ represents the last time where signature $z_i'(\gamma_i)$ was matched by a stream, in one or more embodiments, the distiller executes the signature-expiration process by computing the difference $\delta_i = T_i - \gamma_i$ for is i∈{1 . . . Z''} and removing all signatures $z_i$ for which $\delta_i > \Gamma$. This operation ensures that only the signatures actively being used by the classifier are kept in the signature list and thus reducing the overall background noise introduced by inactive signatures. Accordingly, $Z(T_i) = \{z_1(\gamma_1), z_2(\gamma_2), z_Z(\gamma_Z)\}(T_i)$ is referred to as the remaining set of active signatures generated by the signature expiration process.

Next, in one or more embodiments, the distiller executes a signature-list quality estimation process, by calculating a metric $D(Z(T_i), T_i)$ that reflects the overall level of dissimilarity across all pair-wise combinations of signatures $(z_i, z_j)(T_i)$ with $z_i, z_j \in Z(T_i)$. For example, in order to estimate the dissimilarity between two generic strings, the Compression-Based Dissimilarity Measure (CDM) may be used. The CDM method is based on the concept of Kolmogorov complexity, known to those skilled in the art that represents the randomness of strings based on their information content. The Kolmogorov complexity $K(z_i)$ of a string $z_i$ is defined as the length of the theoretical shortest program capable of producing $z_i$ on a universal computer—such as a Turing machine known to those skilled in the art for thought experiment regarding the limits of theoretical computation. Different programming languages may give rise to distinct values of K(zi) with differences of up to a fixed additive constant. In one regard, $K(z_i)$ is the minimal quantity of information required to generate $z_i$ by an algorithm. The conditional Kolmogorov complexity $K(z_i|z_j)$ of $z_i$ to $z_j$ is defined as the length of the shortest program that computes $z_i$ when $z_j$ is given as an auxiliary input to the program. The function $K(z_iz_j)$ is the length of the shortest program that outputs $z_i$ concatenated to $z_j$. In an example, the Kolmogorov distance between two strings $z_i$ and $z_j$ may be defined as:

$$d_{Kolmogorov} = \frac{(K(z_i|z_j) + K(z_j|z_i))}{K(z_iz_j)}$$

which satisfies the triangle inequality, up to a small error term. In one or more embodiments of the invention, a pre-determined compressor C is used to approximate the Kolmogorov complexity (e.g., by a size of the compressed output of string $z_i$ denoted as $C(z_i)$) and to calculate the following $d_{CDM}$ metric to approximate the Kolmogorov distance:

$$d_{CDM} = \frac{C(z_iz_j)}{C(z_i) + C(z_j)}.$$

Said in other words, the CDM dissimilarity $d_{CDM}$ between two strings $z_i$ and $z_j$ may be determined by concatenating the two strings back-to-back to each other (thus creating the concatenated string $z_iz_j$) to compute the three terms $C(z_iz_j)$, $C(z_i)$ and $C(z_j)$ using a pre-determined compression algorithm.

Generally speaking, the CDM dissimilarity metric $d_{CDM}$ is close to 1 when $z_i$ and $z_j$ are not related (i.e., $C(z_iz_j) \approx C(z_i) + C(z_j)$) and close to 0.5 when $z_i$ and $z_j$ are very similar (i.e., $C(z_iz_j) \approx C(z_i) \approx C(z_j)$). In one or more embodiments, the compression algorithm described in the related U.S. patent application Ser. No. 12/104,723 filed Apr. 17, 2008 and entitled "System and Method for Internet Endpoint Profiling" is used as the compressor C to calculate the CDM dissimilarity $d_{CDM}$ (e.g., between two strings $z_i$ and $z_j$ in the equation above).

In one or more embodiments, the distiller performs the signature-list quality estimation process by computing the dissimilarity metric, using the CDM, of all pair-wise combinations of strings $(z_i, z_j)$ in $Z(T_i)$ constituting the signature list Z up to time $T_i$. In addition, the distiller constructs the overall metric $D(Z(T_i), T_i)$ that captures statistics such as the minimum, average, maximum, standard deviation of certain (e.g., 95%, 99%, etc.) percentile of dissimilarity across all pair-wise combinations of signatures from the set $Z(T_i)$. In embodiments described below, $D(Z(T_i), T_i)$ is defined to capture the minimum value.

Generally speaking, the process of adding a new signature to the signature list may severely deteriorate the quality of the classification process (i.e., a given stream will be mapped to more than one application) and thus lead to a general degradation in the accuracy of the classifier. In one or more embodiments, when the distiller receives a new signature $z_{new}$ at time t in $T_i$, it performs a signature-specific quality estimation process by computing the quality of the new signature $z_{new}$ before adding it into the signature list.

As discussed above, let $D(Z(T_i), T_i)$ be defined to capture the minimum level of dissimilarity across all signatures constituting the signature list $Z(T_i)$ at time T, before adding the new signature $z_{new}$. Let $Z_{new}(T_i) = \{Z(T_i), z_{new}\}$ be a new signature set obtained adding the new signature $z_{new}$ to the current set $Z(T_i)$. In one or more embodiments, the distiller evaluates the metric $D(Z_{new}(T_i), T_i)$ to add the new signature to the signature list when the difference $\delta((Z_{new}, Z)(T_i))$ is less than a pre-determined threshold $\Delta$. Otherwise, the new signature is stored in a list of unresolved signatures together with the set of closely matching signatures. In one or more embodiments, the set of unresolved signatures is analyzed by the distiller during the consolidation process.

In one or more embodiments, the distiller searches for signatures that can be safely merged as a representative of the same application in a signature-list consolidation process. During this process, the distiller analyzes the signatures that have been stored in the list of unresolved signatures. For each of such signatures $z_x$, the distiller refers to the application label $a_x$ from the server profiler and checks whether any of the closest matching signatures shares the same application label.

In case the server profiler is not successful in finding the application label of $z_x$, i.e., $a_x = \{\ \}$ (e.g., in the case of private IP addresses or server behind a NAT device), then the distiller assumes that $z_x$ refers to a different instance of the closest matching application tagged with signature $z_y$, if $z_x$ and $z_y$ are sufficiently similar based on a pre-determined criterion, e.g., the dissimilarity metric of $z_x$ and $z_y$ is less than a pre-determined threshold. In this case, the distiller tags $z_x$ with label $a_y$, and adds the new signature $z_x$ to the set of signatures representative of the closest matching application $a_y$. From that point on, the application $a_y$ is identified using either of the signatures in such a set (i.e., OR operation among all of the application signatures) $\{z_x, z_y\}$.

In case the server profiler was able to successfully find the application label of the new signature $z_x$, i.e., $a_x \neq \{\}$, then the distiller scans the list of closest matching signatures in search for the same application label $a_x$. If this search is successful, then the distiller simply adds the new signature to the set of signatures representative of the common application $a_x$. Said in other words, the applications $a_x = a_y$ are identified by an OR executed on the two discovered signatures $\{z_x, z_y\}$.

In case there is no overlap between the application label of the new signature and the labels of the applications stored in the list of the closest matching signatures, then the new signature is discarded.

In one or more embodiments, the operations executed by the distiller on flow-feature signatures are essentially the same as described above for packet content signatures. The difference between the packet-content and flow-feature signature resides in how the distiller computes the dissimilarity metric between two flow-feature signatures in application space, which is described as a Euclidean distance in the related U.S. patent application Ser. No. 12/501,383 filed Jul. 10, 2009 entitled "System and Method for Identifying Network Applications."

Regarding FIG. 3, in Step 211, a second set of features may be extracted from a second set of packets obtained from a stream X (e.g., 115 of FIG. 1) to form a second server feature matrix of the second server (e.g., P2 or P3). For example, the second set of features may be extracted and the second server feature matrix may be formed in substantially the same manner as described in reference to FIG. 2 above. Accordingly, a second packet content signature of the second server is determined based on the second set of packets, for example, in substantially the same manner as described in reference to FIG. 2 above.

In Step 212, the second packet content signature is compared to a signature library, e.g., the signature library (131) of FIG. 1, which may be formed based on the method of FIG. 2 above. In one or more embodiments, the comparison is based on the CDM based dissimilarity metric described in reference to FIG. 2 above.

In Step 214, a decision is made as to whether the dissimilarity metric between the second packet content signature and one of the packet content signatures associated with an application $a_i$ in the signature library is less than a pre-determined threshold. When the decision is yes, the method proceeds to Step 215 where the stream X and the second server is tagged with the application $a_i$, i.e., stream X is determined to be running the application $a_1$. Accordingly, the networks and traffic streams therein may be managed based on such determination.

If the decision is no, the method proceeds to Step 216 where another decision is made as to whether there remains other signatures in the signature library with which the second packet content signature may be compared for determining matching levels in terms of dissimilarity metric. If the decision is yes, then the method returns to Step 212. If the decision is no, then the second server is determined to be running an unknown application.

In one or more embodiments, the method of FIG. 2 may be performed concurrently with the method of FIG. 3 in each time window in a sequence. For example, the method of FIG. 3 may be performed in time window $T_w$ based on signatures generated by the method of FIG. 2 during a previous time window (e.g., $T_{w-1}$) while the method of FIG. 2 may be generating new signatures in time window $T_w$ to be used by the method of FIG. 3 during a subsequent time window (e.g., $T_{w+1}$).

Returning to the discussion of the signature library (131) in FIG. 1 above, in some example heterogeneous signature library, the signature (132a) may be a packet content signature while the signature (132b) may be a flow feature signature described in the related U.S. patent application Ser. No. 12/501,383 filed Jul. 10, 2009 and entitled "System and Method for Identifying Network Applications."

In one example, the signatures (132a) and (132b) may be associated with different servers running different applications $a_i$ and $a_j$, respectively, and are obtained from different portions of the network, for example network (101a) and (101b), respectively. In some case, the traffic flows may be monitored in the network (101a) with full packet visibility while the traffic flows may be monitored in the network (101b) with net-flow like records visibility, for example due to capability of respective monitoring equipments. Accordingly, the methods described in FIGS. 2 and 3 may be applied to classify network flows in this heterogeneous environment such that the networks and traffic streams therein may be managed based on such classification.

In another example, the signatures (132a) and (132b) may be associated with the same applications $a_i = a_j$ that are generated based on different levels of visibility in captured network data. In some case, the traffic flows may be monitored in the network (101a) with full packet visibility and analyzed based on the packet content signature (132a) while the traffic flows may be monitored in the network (101b) with net-flow like records visibility based on flow feature signature (132b), for example due to capability of respective monitoring equipments. Accordingly, the methods described in FIGS. 2 and 3 may be applied to classify network flows in this heterogeneous environment such that the networks and traffic streams therein may be managed based on such classification.

Although specific formats or structures are used as examples in the foregoing description regarding the flows, the informational block, the feature vectors, the server feature matrix, etc., one skilled in the art, with the benefit of this disclosure, will recognize that other formats or structures may also be used in the system and methods described without deviating from the spirit of the invention.

Figure 4:
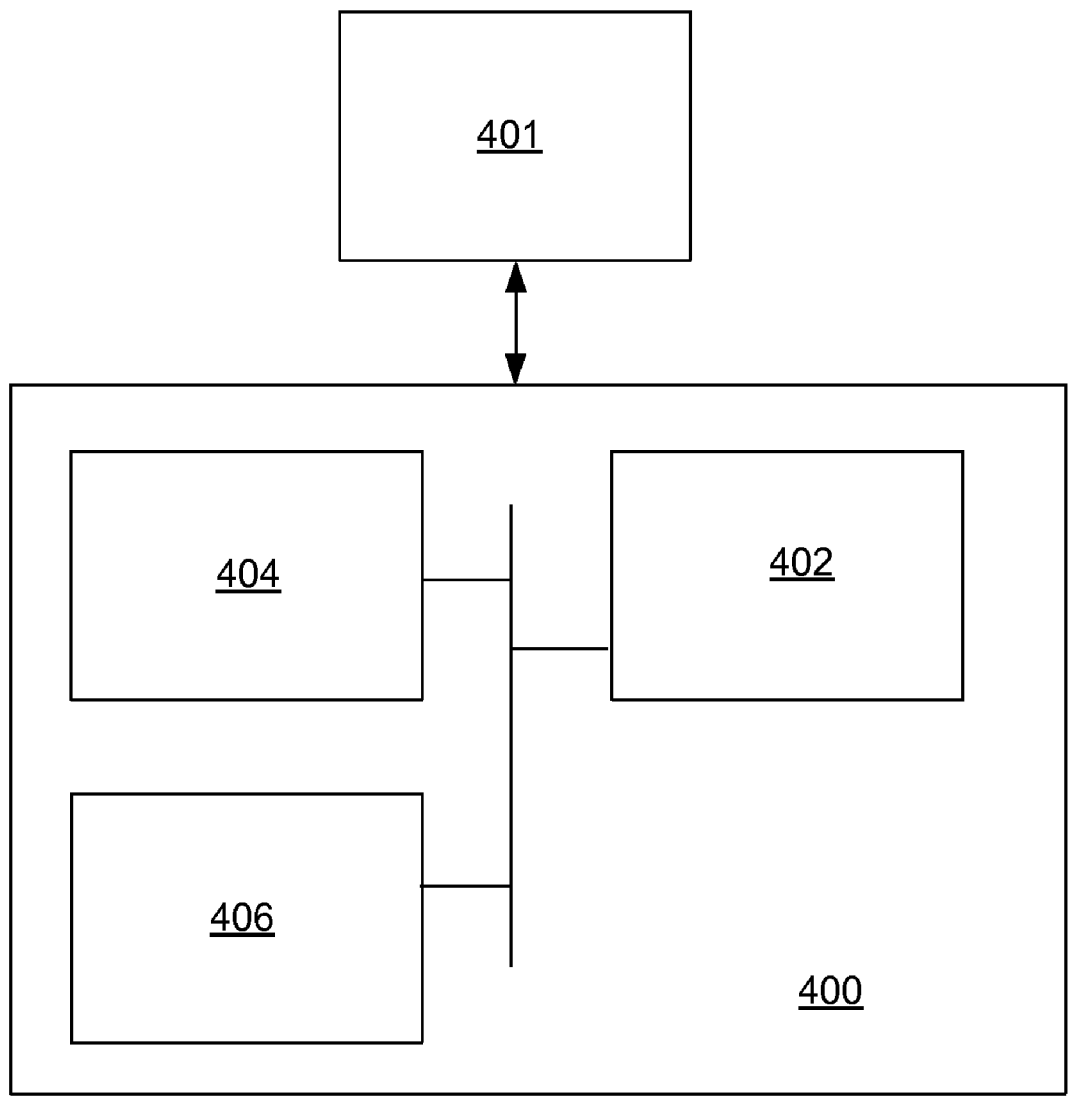
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising: obtaining a first plurality of packets associated with a first server in the network from a plurality of flows in the network traffic; extracting a first plurality of features corresponding to the plurality of flows from the first plurality of packets; iteratively reducing, using a computer, the first plurality of features, comprising: in a first iteration based on a first window size: dividing a first feature and a second feature of the first plurality of features into a first plurality of sections and a second plurality of sections, respectively, wherein a size of at least one section of the first plurality of sections and the second plurality of sections is based on the first window size: comparing a first section of the first plurality of sections and a second section of the second plurality of sections to generate a first matching token based on a pre-determined criterion; retaining, if at least the first matching token exceeds a first pre-determined threshold, the first section and the second section in the first feature and the second feature, respectively; removing, if at least the first matching token is less than a second pre-determined threshold, the first section and the second section from the first feature and the second feature, respectively; and in a second iteration subsequent to the first iteration and based on a second window size reduced from the first window size: dividing the first feature and a third feature of the first plurality of features into a third plurality of sections and a fourth plurality of sections, respectively, wherein a size of at least one section of the third plurality of sections and the fourth plurality of sections is based on the second window size: comparing a third section of the third plurality of sections and a fourth section of the fourth plurality of sections to generate a second matching token based on the pre-determined criterion; retaining, if at least the second matching token exceeds a third pre-determined threshold, the third section and the fourth section in the first feature and the third feature, respectively; removing, if at least the second matching token is less than a fourth pre-determined threshold, the third section and the fourth section from the first feature and the third feature, respectively; determining, using the computer, a first packet content signature based on the first plurality of features by at least iteratively reducing the first plurality of features, wherein the packet content signature is associated with a network application running on the first server; and determining, using the computer, a second server in the network as running the network application by analyzing a second plurality of packets associated with the second server in the network traffic based on the first packet content signature.

2. The method of claim 1, wherein each of the first plurality of features comprises a pre-determined number of bytes of each of a pre-determined number of packets of one of the plurality of flows.

3. The method of claim 1, further comprising:
forming a first server feature matrix of the first server using the plurality of features as row vectors of the first server feature matrix; and
determining, using the computer, a longest common subsequence among the first plurality of features by applying a sliding window to the row vectors of the first server feature matrix,
wherein the first racket content signature is determined based on the longest common subsequence.

4. The method of claim 1, wherein obtaining the first plurality of packets associated with the first server from the network traffic comprises:
obtaining a plurality of data packets from the network traffic;
identifying an IP address of which percentage occurrences in destination IP address fields in the plurality of data packets exceeds a pre-determined threshold;
identifying an end point of the network associated with the IP address as the first server; and
extracting the first plurality of packets from the plurality of data packets based on the IP address of the first server.

5. The method of claim 1, wherein analyzing the second plurality of packets associated with the second server in the network traffic based on the packet content signature comprises:
determining, using the computer, a second packet content signature based on the second plurality of packets;
determining a dissimilarity metric of the first and second packet content signatures; and
comparing the dissimilarity metric to a pre-determined threshold,
wherein the second server is determined as running the network application when the dissimilarity metric is less than the pre-determined threshold.

6. The method of claim 5, wherein the dissimilarity metric of the first and second packet content signatures is determined based on $$d_{CDM} = \frac{C(z_i z_j)}{C(z_i) + C(z_j)},$$

where $z_i$ and $z_j$ represent the first and second packet content signatures, respectively, $C(z_i)$ and $C(z_j)$ represent sizes of compressed outputs of the first and second packet content signatures based on a pre-determined compressor C, respectively, and $C(z_i z_j)$ represents a size of a compressed output, based on the pre-determined compressor C, of a concatenated string comprising the first and second packet content signatures.

7. A non-transitory computer readable medium, embodying instructions when executed by a computer to profile network traffic of a network, the instructions comprising functionality for: obtaining a first plurality of packets associated with a first server in the network from a plurality of flows in the network traffic; extracting a first plurality of features corresponding to the plurality of flows from the first plurality of packets; iteratively reducing the first plurality of features, comprising: in a first iteration based on a first window size: dividing a first feature and a second feature of the first plurality of features into a first plurality of sections and a second plurality of sections, respectively, wherein a size of at least one section of the first plurality of sections and the second plurality of sections is based on the first window size: comparing a first section of the first plurality of sections and a second section of the second plurality of sections to generate a first matching token based on a pre-determined criterion; retaining, if at least the first matching token exceeds a first pre-determined threshold, the first section and the second section in the first feature and the second feature, respectively; and removing, if at least the first matching token is less than a second pre-determined threshold, the first section and the second section from the first feature and the second feature, respectively; and in a second iteration subsequent to the first iteration and based on a second window size reduced from the first window size: dividing the first feature and a third feature of the first plurality of features into a third plurality of sections and a fourth plurality of sections, respectively, wherein a size of at least one section of the third plurality of sections and the fourth plurality of sections is based on the second window size: comparing a third section of the third plurality of sections and a fourth section of the fourth plurality of sections to generate a second matching token based on the pre-determined criterion; retaining, if at least the second matching token exceeds a third pre-determined threshold, the third section and the fourth section in the first feature and the third feature, respectively; and removing, if at least second matching token is less than a fourth pre-determined threshold, the third section and the fourth section from the first feature and the third feature, respectively; determining a first packet content signature based on the first plurality of features by at least the iteratively reducing the first plurality of features, wherein the packet content signature is associated with a network application running on the first server; and determining a second server in the network as running the network application by analyzing a second plurality of packets associated with the second server in the network traffic based on the first packet content signature.

8. The non-transitory computer readable medium of claim 7, wherein each of the first plurality of features comprises a pre-determined number of bytes of each of a pre-determined number of packets of one of the plurality of flows.

9. The non-transitory computer readable medium of claim 7, the instructions when executed by the computer further comprising functionalities for:
forming a first server feature matrix of the first server using the plurality of features as row vectors of the first server feature matrix; and
determining a longest common subsequence among the first plurality of features by applying a sliding window to the row vectors of the first server feature matrix,
wherein the first racket content signature is determined based on the longest common subsequence.

10. The non-transitory computer readable medium of claim 7, wherein obtaining the first plurality of packets associated with the first server from the network traffic comprises:
obtaining a plurality of data packets from the network traffic;
identifying an IP address of which percentage occurrences in destination IP address fields in the plurality of data packets exceeds a pre-determined threshold;
identifying an end point of the network associated with the IP address as the first server; and
extracting the first plurality of packets from the plurality of data packets based on the IP address of the first server.

11. The non-transitory computer readable medium of claim 7, wherein analyzing the second plurality of packets associated with the second server in the network traffic based on the packet content signature comprises:
determining, using the computer, a second packet content signature based on the second plurality of packets;
determining a dissimilarity metric of the first and second packet content signatures; and
comparing the dissimilarity metric to a pre-determined threshold,
wherein the second server is determined as running the network application when the dissimilarity metric is less than the pre-determined threshold.

12. The non-transitory computer readable medium of claim 11, wherein the dissimilarity metric of the first and second packet content signatures is determined based on $$d_{CDM} = \frac{C(z_i z_j)}{C(z_i) + C(z_j)},$$

where $z_i$ and $z_j$ represent the first and second packet content signatures, respectively, $C(z_i)$ and $C(z_j)$ represent sizes of compressed outputs of the first and second packet content signatures based on a pre-determined compressor C, respectively, and $C(z_i z_j)$ represents a size of a compressed output, based on the pre-determined compressor C, of a concatenated string comprising the first and second packet content signatures.

13. A system for profiling network traffic of a network, comprising: a statistical analyzer configured to: obtain a first plurality of packets associated with a first server in the network from a plurality of flows in the network traffic; extract a first plurality of features corresponding to the plurality of flows from the first plurality of packets; a signature generator configured to: iteratively reduce the first plurality of features, comprising: in a first iteration based on a first window size: dividing a first feature and a second feature of the first plurality of features into a first plurality of sections and a second plurality of sections, respectively, wherein a size of at least one section of the first plurality of sections and the second plurality of sections is based on the first window size; comparing a first section of the first plurality of sections and a second section of the second plurality of sections to generate a first matching token based on a pre-determined criterion; retaining, if at least the first matching token exceeds a first pre-determined threshold, the first section and the second section in the first feature and the second feature, respectively; and removing, if at least the first matching token is less than a second pre-determined threshold, the first section and the second section from the first feature and the second feature, respectively; and in a second iteration subsequent to the first iteration and based on a second window size reduced from the first window size: dividing the first feature and a third feature of the first plurality of features into a third plurality of sections and a fourth plurality of sections, respectively, wherein a size of at least one section of the third plurality of sections and the fourth plurality of sections is based on the second window size; comparing a third section of the third plurality of sections and a fourth section of the fourth plurality of sections to generate a second matching token based on the pre-determined criterion; retaining, if at least the second matching token exceeds a third pre-determined threshold, the third section and the fourth section in the first feature and the third feature, respectively; and removing, if at least the second matching token is less than a fourth pre-determined threshold, the third section and the fourth section from the first feature and the third feature, respectively; and determine a first packet content signature based on the first plurality of features by at least iteratively reducing the first plurality of features; a signature library comprising a plurality of packet content signatures; a distiller configured to qualify the first packet content signature for adding to the signature library; and a processor and memory storing instructions when executed by the processor comprising functionalities to: analyze a second plurality of packets associated a the second server in the network traffic based on the signature library to generate an analysis result; and determine a network application associated with the second server based on the analysis result.

14. The system of claim 13, wherein each of the first plurality of features comprises a pre-determined number of bytes of each of a pre-determined number of packets of one of the plurality of flows.

15. The system of claim 13, wherein the signature generator is configured to determine the first packet content signature based on a longest common subsequence among the first plurality of features obtained by applying a sliding window to the first plurality of features.

16. The system of claim 15,
wherein the statistical analyzer is further configured to form a first server feature matrix of the first server using the plurality of features as row vectors of the first server feature matrix, and
wherein the signature generator is further configured to determine the longest common subsequence among the first plurality of features by applying the sliding window to the row vectors of the first server feature matrix.

17. The system of claim 13, wherein obtaining the first plurality of packets associated with the first server from the network traffic comprises:
obtaining a plurality of data packets from the network traffic;
identifying an IP address of which percentage occurrences in destination IP address fields in the plurality of data packets exceeds a pre-determined threshold;
identifying an end point of the network associated with the IP address as the first server; and
extracting the first plurality of packets from the plurality of data packets based on the IP address of the first server.

18. The system of claim 13, wherein analyzing the second plurality of packets associated with the second server in the network traffic based on the signature library comprises:
determining a second packet content signature based on the second plurality of packets;
determining a dissimilarity metric of the first and second packet content signatures; and
comparing the dissimilarity metric to a pre-determined threshold to generate the analysis result,
wherein the second server is determined as running the network application when the dissimilarity metric is less than the pre-determined threshold.

19. The system of claim 18, wherein the dissimilarity metric of the first and second packet content signatures is determined based on $$d_{CDM} = \frac{C(z_i z_j)}{C(z_i) + C(z_j)},$$

where $z_i$ and $z_j$ represent the first and second packet content signatures, respectively, $C(z_i)$ and $C(z_j)$ represent sizes of compressed outputs of the first and second packet content signatures based on a pre-determined compressor C, respectively, and $C(z_i z_j)$ represents a size of a compressed output, based on the pre-determined compressor C, of a concatenated string comprising the first and second packet content signatures.

20. The system of claim 13, wherein the distiller is configured to qualify the first packet content signature by determining a quality metric of the signature library based on pair-wise dissimilarity metrics of each pair of packet content signatures in the signature library.

21. The system of claim 20, wherein the distiller is further configured to qualify the first packet content signature by comparing an incremental change in the quality metric of the signature library as a result of adding the first packet content signature to a pre-determined threshold.

22. The system of claim 13, wherein the distiller is further configured to exclude a packet content signature from the signature library when an inactivity time of the packet content signature exceeds a pre-determined threshold, wherein the inactivity time is measure from a most recent time when the packet content signature is used by the processor for analysis.

23. The system of claim 13, wherein the distiller is further configured to consolidate the signature library based on pair-wise dissimilarity metrics of each pair of packet content signatures in the signature library.

* * * * *